US012464503B2

United States Patent
Lou et al.

(10) Patent No.: US 12,464,503 B2
(45) Date of Patent: Nov. 4, 2025

(54) DATA TRANSMISSION METHOD AND APPARATUS

(71) Applicant: HUAWEI TECHNOLOGIES CO., LTD., Shenzhen (CN)

(72) Inventors: Chong Lou, Shanghai (CN); Qiang Fan, Shanghai (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 17/966,533

(22) Filed: Oct. 14, 2022

(65) Prior Publication Data

US 2023/0034266 A1     Feb. 2, 2023

Related U.S. Application Data

(63) Continuation of application No. PCT/CN2021/085476, filed on Apr. 3, 2021.

(30) Foreign Application Priority Data

Apr. 17, 2020    (CN) .......................... 202010303300.2

(51) Int. Cl.
    *H04W 72/044*      (2023.01)
    *H04L 1/1812*      (2023.01)

(52) U.S. Cl.
    CPC ......... *H04W 72/044* (2013.01); *H04L 1/1812* (2013.01)

(58) Field of Classification Search
CPC . H04W 72/044; H04W 72/11; H04W 72/115; H04W 72/1263; H04W 72/23; H04W 72/0446; H04W 72/0453; H04L 1/1812
See application file for complete search history.

(56) References Cited

U.S. PATENT DOCUMENTS

| | | | |
|---|---|---|---|
| 11,297,541 B2 * | 4/2022 | Joseph | ................... H04W 56/00 |
| 12,218,762 B2 * | 2/2025 | Iyer | ....................... H04L 1/1819 |
| 2020/0059829 A1 * | 2/2020 | Joseph | .............. H04W 36/0011 |

(Continued)

FOREIGN PATENT DOCUMENTS

| | | |
|---|---|---|
| CN | 110971360 A | 4/2020 |
| WO | 2019160247 A1 | 8/2019 |

(Continued)

OTHER PUBLICATIONS

Sequans Communications, Handling of collisions with a CG; 3rd Generation Partnership Project (3GPP), R2-1913624, Oct. 18, 2019 (Year: 2019).*

(Continued)

*Primary Examiner* — Abdullahi Ahmed
(74) *Attorney, Agent, or Firm* — Leydig, Voit & Mayer, Ltd.

(57) ABSTRACT

A data transmission method and an apparatus are provided. When a time-frequency resource used by a terminal device for data transmission is unavailable, the terminal device postpones, based on indication information of a network device and/or according to a postponement rule, the data transmission to a time-frequency resource closest to the time-frequency resource. Therefore, a data transmission latency is reduced.

16 Claims, 3 Drawing Sheets

Core network device 110     Radio access network device 120     Terminal device 130

Terminal device 140

(56) References Cited

U.S. PATENT DOCUMENTS

| | | | |
|---|---|---|---|
| 2020/0112964 A1 | 4/2020 | Yang et al. | |
| 2022/0039100 A1 | 2/2022 | Yoshioka et al. | |
| 2022/0361200 A1* | 11/2022 | Yoshioka | H04L 5/0048 |
| 2023/0034266 A1* | 2/2023 | Lou | H04L 1/1812 |
| 2023/0379898 A1* | 11/2023 | Kumagai | H04L 1/08 |

FOREIGN PATENT DOCUMENTS

| | | |
|---|---|---|
| WO | 2020036921 A1 | 2/2020 |
| WO | 2020065893 A1 | 4/2020 |

OTHER PUBLICATIONS

Huawei, HiSilicon, "PUSCH enhancements for URLLC," 3GPP TSG RAN WG1 Meeting #96, Athens, Greece, R1-1901559, Total 13 pages, 3rd Generation Partnership Project, Valbonne, France (Feb. 25-Mar. 1, 2019).

"Handling of collisions with a CG," 3GPP TSG-RAN WG2 Meeting #107bis, R2-1913624 Resubmission of R2-1911383, Total 4 pages, 3rd Generation Partnership Project, Valbonne, France (Oct. 14-18, 2019).

"Leftover issues for CG/CG and CG/DG prioritization," 3GPP TSG-RAN WG2 Meeting #106, R2-1905748, revision of R2-1903143, pp. 1-4, 3rd Generation Partnership Project, Valbonne, France (May 13-17, 3019).

"3rd Generation Partnership Project; Technical Specification Group Radio Access Network; NR; Physical layer procedures for data (Release 16)," 3GPP TS 38.214 V16.1.0, pp. 1-151, 3rd Generation Partnership Project, Valbonne, France (Mar. 2020).

"3rd Generation Partnership Project; Technical Specification Group Radio Access Network; NR; Radio Resource Control (RRC) protocol specification (Release 16)," 3GPP TS 38.331 V16.0.0, pp. 1-835, 3rd Generation Partnership Project, Valbonne, France (Mar. 2020).

"Measurement gap skipping for TSN traffic," 3GPP TSG-RAN WG2 Meeting #108, R2-1915919 (Revision of R2-1913135), Rena, USA, Total 2 pages, 3rd Generation Partnership Project, Valbonne, France (Nov. 18-22, 2019).

"Summary on deprioritized transmissions," 3GPP TSG-RAN WG2 Meeting #109 electronic, Elbonia, R2-2000485, pp. 1-8, 3rd Generation Partnership Project, Valbonne, France (Feb. 24-28, 2020).

* cited by examiner

DATA TRANSMISSION METHOD AND APPARATUS

CROSS-REFERENCE TO RELATED APPLICATIONS

This application is a continuation of International Application No. PCT/CN2021/085476, filed on Apr. 3, 2021, which claims priority to Chinese Patent Application No. 202010303300.2, filed on Apr. 17, 2020. The disclosures of the aforementioned applications are hereby incorporated by reference in their entireties.

TECHNICAL FIELD

Embodiments of this application relate to the wireless communication field, and in particular, to a data transmission method and an apparatus.

BACKGROUND

Compared with a 4th generation (4G) mobile communication system, a significant feature of a 5th generation (5G) mobile communication system is that an ultra-reliable and low-latency communication (URLLC) service is additionally supported. There are a plurality of types of URLLC services. Typical examples include industrial control, self-driving, remote surgery, a smart grid, and the like. For a URLLC service, a typical requirement is that reliability of sending 32-byte data within 1 millisecond (ms) needs to reach 99.999%. It should be noted that, the foregoing performance indicator is merely an example, and different URLLC services may have different requirements on reliability. For example, in some extremely demanding industrial control application scenarios, a transmission success probability of URLLC service data needs to reach 99.9999999% within 0.25 ms.

SUMMARY

This application provides a data transmission method and an apparatus, to reduce a data transmission latency.

According to a first aspect, this application provides a data transmission method. The method is performed by a terminal device or a module in the terminal device. An example in which the method is performed by the terminal device is used herein for description. The terminal device receives first indication information from a network device, where the first indication information includes configuration information of a first time-frequency resource. The terminal device obtains first time information when the first time-frequency resource is unavailable. The terminal device determines a second time-frequency resource based on the first time information and the first time-frequency resource, where a time domain position of the second time-frequency resource is after a time domain position of the first time-frequency resource. The terminal device sends uplink data to the network device on the second time-frequency resource, or receives downlink data from the network device on the second time-frequency resource.

Through implementation of the method described in the first aspect, when the first time-frequency resource used by the terminal device for data transmission is unavailable, the terminal device obtains the first time information, determines the second time-frequency resource based on the first time information and the first time-frequency resource, and postpones the data transmission from the first time-frequency resource to the second time-frequency resource after the first time-frequency resource. Therefore, latency impact caused by unavailability of the first time-frequency resource is reduced, and a data transmission latency is reduced.

In a possible implementation of the first aspect, the first time-frequency resource is a configured grant (CG) or a downlink semi-persistent scheduling (SPS).

In a possible implementation of the first aspect, the obtaining first time information specifically includes: The terminal device determines the first time information according to a postponement rule, where the postponement rule is predefined. Through implementation of the method, the terminal device may determine the first time information according to the predefined postponement rule, to further determine the second time-frequency resource, and the network device does not need to indicate the second time-frequency resource by using indication information. Therefore, signaling overheads are reduced.

In a possible implementation of the first aspect, the determining the first time information according to a postponement rule specifically includes: The terminal device receives second indication information from the network device, where the second indication information indicates whether to use the postponement rule. The terminal device determines the first time information based on the second indication information and according to the postponement rule. Through implementation of the method, the network device may configure, by using the indication information, whether the terminal device uses the postponement rule. Therefore, resource configuration flexibility is improved.

In a possible implementation of the first aspect, the obtaining first time information specifically includes: The terminal device receives third indication information from the network device, where the third indication information indicates the first time information. Through implementation of the method, when the first time-frequency resource is unavailable due to a channel access failure of the network device and the terminal device cannot predict that the time-frequency resource is unavailable, the network device may indicate the first time information to the terminal device in real time by using the indication information, and the terminal device determines the second time-frequency resource based on the indication information and performs data transmission with the network device on the second time-frequency resource. Therefore, data transmission reliability is improved.

In a possible implementation of the first aspect, the first time information is a time domain offset of the second time-frequency resource relative to the first time-frequency resource.

In a possible implementation of the first aspect, the first time information is an index of a time unit in which the second time-frequency resource is located.

According to a second aspect, this application provides a data transmission method. The method is performed by a network device or a module in the network device. An example in which the method is performed by the network device is used herein for description. The network device sends first indication information to a terminal device, where the first indication information includes configuration information of a first time-frequency resource. The network device receives fourth indication information from the terminal device when the first time-frequency resource is unavailable, where the fourth indication information indicates a second time-frequency resource, and a time domain position of the second time-frequency resource is after a time domain position of the first time-frequency resource.

The network device receives uplink data from the terminal device on the second time-frequency resource, or sends downlink data to the terminal device on the second time-frequency resource.

The method described in the second aspect is a network-side method corresponding to the method described in the first aspect. Therefore, beneficial effects in the first aspect can also be achieved.

In a possible implementation of the second aspect, the first time-frequency resource is a configured grant or a downlink semi-persistent scheduling.

In a possible implementation of the second aspect, the first time information is determined according to a postponement rule, and the postponement rule is predefined.

In a possible implementation of the second aspect, the network device sends second indication information to the terminal device, where the second indication information indicates whether to use the postponement rule.

In a possible implementation of the second aspect, the network device sends third indication information to the terminal device, where the third indication information indicates the first time information.

In a possible implementation of the second aspect, the first time information is a time domain offset of the second time-frequency resource relative to the first time-frequency resource.

In a possible implementation of the second aspect, the first time information is an index of a time unit in which the second time-frequency resource is located.

According to a third aspect, this application provides a data transmission method. The method is performed by a terminal device or a module in the terminal device. An example in which the method is performed by the terminal device is used herein for description. The terminal device receives first indication information from a network device, where the first indication information includes configuration information of a first time-frequency resource. The terminal device sends fourth indication information to the network device when the first time-frequency resource is unavailable, where the fourth indication information indicates a second time-frequency resource, and a time domain position of the second time-frequency resource is after a time domain position of the first time-frequency resource. The terminal device sends uplink data to the network device on the second time-frequency resource, or receives downlink data from the network device on the second time-frequency resource.

Through implementation of the method described in the third aspect, when the first time-frequency resource is unavailable, the terminal device postpones data transmission from the first time-frequency resource to the second time-frequency resource after the first time-frequency resource, and indicates the second time-frequency resource to the network device, so that the network device may perform data transmission with the terminal device on the corresponding time-frequency resource. Therefore, data transmission reliability is improved.

According to a fourth aspect, this application provides a data transmission method. The method is performed by a network device or a module in the network device. An example in which the method is performed by the network device is used herein for description. The network device sends first indication information to a terminal device, where the first indication information includes configuration information of a first time-frequency resource. The network device receives fourth indication information from the terminal device when the first time-frequency resource is unavailable, where the fourth indication information indicates a second time-frequency resource, and a time domain position of the second time-frequency resource is after a time domain position of the first time-frequency resource. The network device receives uplink data from the terminal device on the second time-frequency resource, or sends downlink data to the terminal device on the second time-frequency resource.

The method described in the fourth aspect is a network-side method corresponding to the method described in the third aspect. Therefore, beneficial effects in the third aspect can also be achieved.

According to a fifth aspect, a communication apparatus is provided. The communication apparatus includes a functional module configured to implement the method according to any one of the first aspect or the possible implementations of the first aspect or any one of the third aspect or the possible implementations of the third aspect.

According to a sixth aspect, a communication apparatus is provided. The communication apparatus includes a functional module configured to implement the method according to any one of the second aspect or the possible implementations of the second aspect or any one of the fourth aspect or the possible implementations of the fourth aspect.

According to a seventh aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to any one of the first aspect or the possible implementations of the first aspect or any one of the third aspect or the possible implementations of the third aspect by using a logic circuit or executing code instructions.

According to an eighth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to any one of the second aspect or the possible implementations of the second aspect or any one of the fourth aspect or the possible implementations of the fourth aspect by using a logic circuit or executing code instructions.

According to a ninth aspect, a computer-readable storage medium is provided. The computer-readable storage medium stores a computer program or instructions. When the computer program or the instructions are executed, the method according to any one of the first aspect or the possible implementations of the first aspect or any one of the third aspect or the possible implementations of the third aspect is implemented.

According to a tenth aspect, a computer-readable storage medium is provided. The computer-readable storage medium stores a computer program or instructions. When the computer program or the instructions are executed, the method according to any one of the second aspect or the possible implementations of the second aspect or any one of the fourth aspect or the possible implementations of the fourth aspect is implemented.

According to an eleventh aspect, a computer program product including instructions is provided. When the instructions are run, the method according to any one of the first aspect or the possible implementations of the first aspect or any one of the third aspect or the possible implementations of the third aspect is implemented.

According to a twelfth aspect, a computer program product including instructions is provided. When the instructions are run, the method according to any one of the second aspect or the possible implementations of the second aspect or any one of the fourth aspect or the possible implementations of the fourth aspect is implemented.

According to a thirteenth aspect, a computer program is provided. The computer program includes code or instructions. When the code or the instructions are run, the method according to any one of the first aspect or the possible implementations of the first aspect or any one of the third aspect or the possible implementations of the third aspect is implemented.

According to a fourteenth aspect, a computer program is provided. The computer program includes code or instructions. When the code or the instructions are run, the method according to any one of the second aspect or the possible implementations of the second aspect or any one of the fourth aspect or the possible implementations of the fourth aspect is implemented.

According to a fifteenth aspect, a chip system is provided. The chip system includes a processor, may further include a memory, and is configured to implement at least one method described in the first aspect to the fourth aspect. The chip system may include a chip, or may include a chip and another discrete component.

According to a sixteenth aspect, a communication system is provided. The system includes the apparatus (for example, a terminal device) described in the fifth aspect or the seventh aspect and the apparatus (for example, a network device) described in the sixth aspect or the eighth aspect.

DETAILED DESCRIPTION OF EMBODIMENTS

Figure 1:
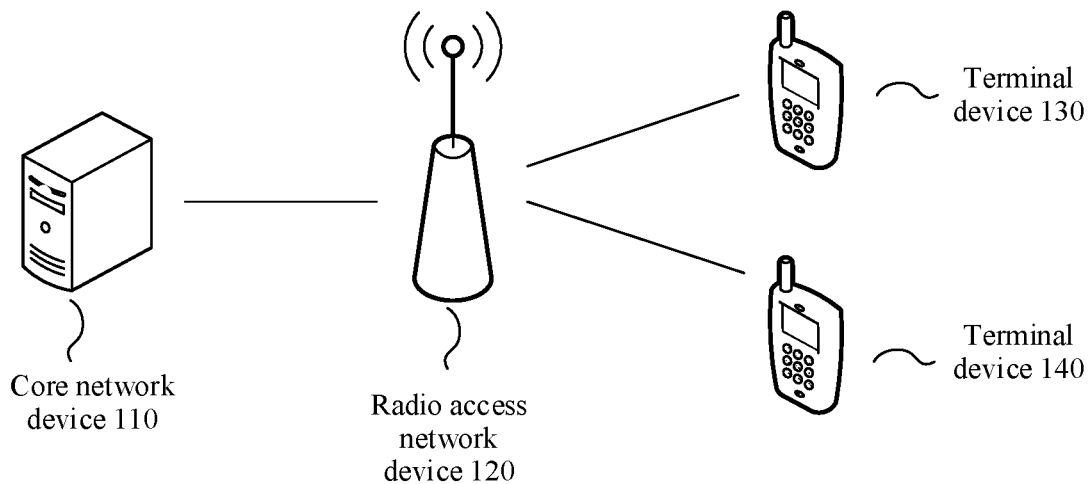
FIG. 1 is a schematic diagram of an architecture of a communication system to which embodiments of this application are applied.

Technical solutions provided in embodiments of this application may be applied to various communication systems, for example, a long term evolution (LTE) system, a 5th generation (5G) mobile communication system, a Wi-Fi system, a future communication system, a system integrating a plurality of communication systems, or the like. This is not limited in embodiments of this application. 5G may also be referred to as new radio (NR).

The technical solutions provided in embodiments of this application may be applied to various communication scenarios, for example, may be applied to one or more of the following communication scenarios: enhanced mobile broadband (eMBB), ultra-reliable and low-latency communication (URLLC), machine type communication (MTC), massive machine-type communications (mMTC), device-to-device (D2D), vehicle-to-everything (V2X), vehicle-to-vehicle (V2V), internet of things (IoT), and the like.

The technical solutions provided in embodiments of this application may be applied to communication between communication devices. The communication between communication devices may include communication between a network device and a terminal device, communication between network devices, and/or communication between terminal devices. In embodiments of this application, the term "communication" may also be described as "transmission", "information transmission", "signal transmission", or the like. The transmission may include sending and/or receiving. In embodiments of this application, the communication between a network device and a terminal device is used as an example to describe the technical solutions. A person skilled in the art may also apply the technical solutions to other communication between a scheduling entity and a subordinate entity, for example, communication between a macro base station and a micro base station, for example, communication between a first terminal device and a second terminal device. The scheduling entity may allocate air interface resources to the subordinate entity. The air interface resources include one or more of the following resources: time domain resources, frequency domain resources, code resources, and spatial resources. In embodiments of this application, "a plurality of types" may be two types, three types, four types, or more types. This is not limited in embodiments of this application.

In embodiments of this application, the communication between a network device and a terminal device includes: The network device sends a downlink signal/downlink information to the terminal device, and/or the terminal device sends an uplink signal/uplink information to the network device.

In embodiments of this application, "/" may represent an "or" relationship between associated objects. For example, A/B may represent A or B. "and/or" may be used to indicate that there are three relationships between the associated objects. For example, A and/or B may represent the following three cases: Only A exists, both A and B exist, and only B exists. A and B may be singular or plural. In embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent giving an example, an illustration, or a description. Any embodiment or design scheme described as an "example" or "for example" should not be explained as being more preferred or having more advantages than another embodiment or design scheme. Use of the term such as "example" or "for example" is intended to present a related concept in a specific manner for ease of understanding.

FIG. 1 is a schematic diagram of an architecture of a mobile communication system to which embodiments of this application are applied. As shown in FIG. 1, the mobile communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be independent and different physical devices, or a function of the core network device and a logical function of the radio access network device may be integrated into a same physical device, or a part of functions of the core network device and a part of functions of the radio access network device may be integrated into one physical device. The terminal device may be located at a fixed position, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in embodiments of this application.

The radio access network device is an access device that is used by the terminal device to access the mobile communication system in a wireless manner. The radio access network device may be a base station, an evolved NodeB (eNodeB), a transmission reception point (TRP), a next generation NodeB (gNB) in a 5G mobile communication system, a base station in a future mobile communication system, an access node in a Wi-Fi system, or the like. Alternatively, the radio access network device may be a module or a unit that implements a part of functions of a base station, for example, may be a central unit (CU) or a distributed unit (DU). A specific technology and a specific device form that are used by the radio access network device are not limited in embodiments of this application. In embodiments of this application, the radio access network device is referred to as a network device for short. Unless otherwise specified, network devices are all radio access network devices.

In embodiments of this application, an apparatus configured to implement a function of the network device may be a network device, or may be an apparatus, for example, a chip system, that can support the network device in implementing the function. The apparatus may be deployed in the network device, or may be used together with the network device. In the technical solutions provided in embodiments of this application, an example in which the apparatus configured to implement the function of the network device is a network device is used to describe the technical solutions provided in embodiments of this application.

The terminal device in embodiments of this application may also be referred to as a terminal, user equipment (UE), a mobile station (MS), a mobile terminal (MT), or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

In embodiments of this application, an apparatus configured to implement a function of the terminal device may be a terminal device, or may be an apparatus, for example, a chip system, that can support the terminal device in implementing the function. The apparatus may be deployed in the terminal device, or may be used together with the terminal device. In embodiments of this application, the chip system may include a chip, or may include a chip and another discrete component. In the technical solutions provided in embodiments of this application, an example in which the apparatus configured to implement the function of the terminal device is a terminal device is used to describe the technical solutions provided in embodiments of this application.

The network device and the terminal device may be deployed on land, where the deployment includes indoor or outdoor, or handheld or vehicle-mounted deployment, may be deployed on water, or may be deployed on an aerocraft, a balloon, or an artificial satellite in air. An application scenario of the network device and the terminal device is not limited in embodiments of this application.

Communication between the network device and the terminal device may be performed on a licensed spectrum, may be performed on an unlicensed spectrum, or may be performed on both a licensed spectrum and an unlicensed spectrum. The communication between the network device and the terminal device may be performed on a spectrum below 6 gigahertz (GHz), may be performed on a spectrum above 6 GHz, or may be performed on both a spectrum below 6 GHz and a spectrum above 6 GHz. A spectrum resource used between the network device and the terminal device is not limited in embodiments of this application.

In the communication system, the terminal device may access the network device and communicate with the network device. For example, one network device may manage one or more (for example, three or six) cells, and the terminal device may access the network device in at least one of the one or more cells, and communicate with the network device in a cell in which the terminal device is located. In embodiments of this application, "at least one" may be one, two, three, or more. This is not limited in embodiments of this application.

An implementation in which the terminal device performs uplink data transmission with the network device may be grant-free transmission. To be specific, the terminal device sends uplink data to the network device by using a grant-free resource. In the grant-free transmission, uplink transmission of the terminal device does not need to be completed through scheduling by the network device. For example, when the uplink data arrives, the terminal device does not need to send a scheduling request (SR) to the network device and wait for a dynamic grant of the network device, but may directly send the uplink data to the network device by using an uplink transmission resource preallocated by the network device. In embodiments of this application, "grant-free transmission" is also referred to as "grant-free scheduling", and the preallocated uplink transmission resource may be referred to as a "configured grant (CG)" or an uplink configured grant.

An implementation in which the terminal device performs downlink data transmission with the network device may be semi-persistent transmission. In embodiments of this application, the semi-persistent transmission may also be referred to as semi-persistent scheduling (SPS) or downlink semi-persistent transmission. In the semi-persistent transmission, the network device does not need to dynamically indicate a downlink transmission resource by using downlink control information (DCI), and the terminal device may receive downlink data from the network device on a downlink transmission resource preallocated by the network device. In embodiments of this application, the preallocated downlink transmission resource may be referred to as a downlink SPS resource.

When the terminal device performs data transmission by using the CG and the downlink SPS resource, how to reduce a data transmission latency is an urgent problem to be resolved. To resolve the foregoing technical problem, embodiments of this application provide a data transmission method. When a time-frequency resource used by a terminal device for data transmission is unavailable, the terminal device postpones, based on indication information of a network device and/or according to a postponement rule, the data transmission to a time-frequency resource closest to the time-frequency resource. Therefore, a data transmission latency is reduced.

The following describes the technical solutions in this application in detail by using some embodiments. In embodiments of this application, when the terminal device performs data transmission with the network device, the terminal device may be in a radio resource control connected (radio resource control_connected, RRC_CONNECTED) state, a radio resource control inactive (radio resource control_inactive, RRC_INACTIVE) state, or a radio resource control idle (radio resource control_idle, RRC_IDLE) state.

Figure 2:
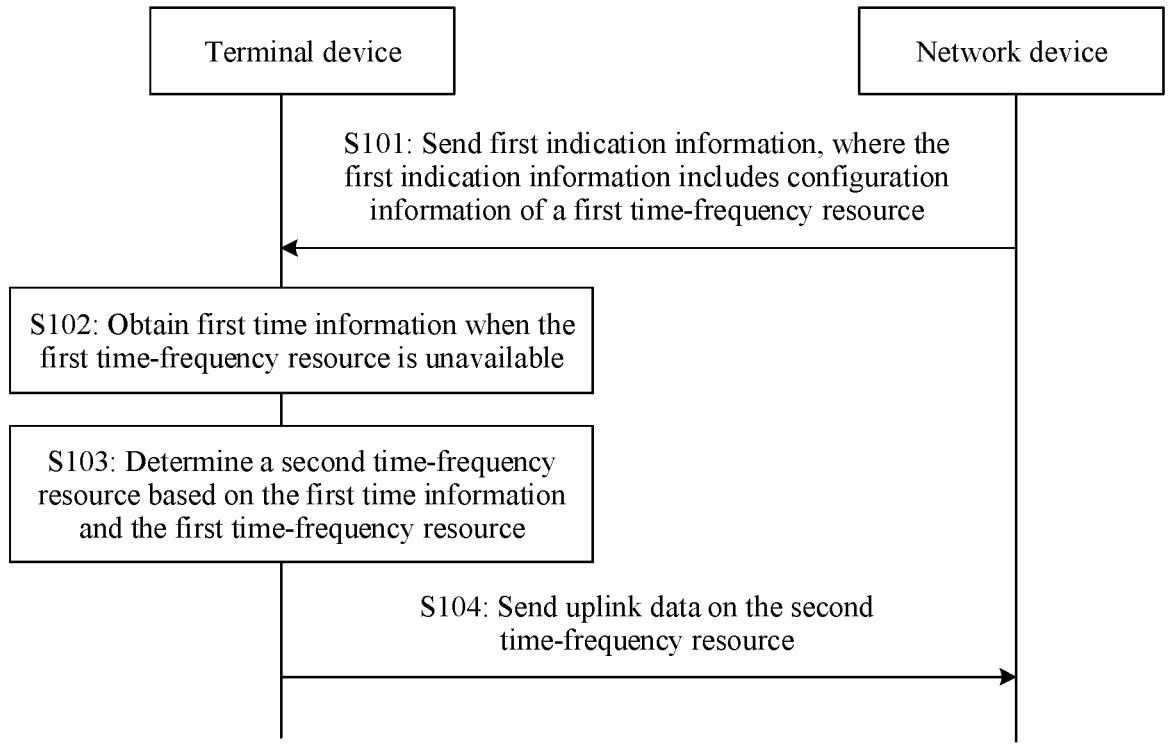
FIG. 2 to FIG. 5 are schematic flowcharts of data transmission methods according to embodiments of this application.

FIG. 2 is a schematic flowchart of a data transmission method according to an embodiment of this application. This embodiment relates to a specific process of data transmission between a network device and a terminal device. As shown in FIG. 2, the method may include S101, S102, S103, and S104.

S101: The network device sends first indication information to the terminal device, where the first indication information includes configuration information of a first time-frequency resource. Correspondingly, the terminal device receives the first indication information from the network device. Specifically, the first indication information may be an RRC message, for example, an RRC setup message, an RRC resume message, or an RRC connection reconfiguration message.

In the embodiment shown in FIG. 2, the first time-frequency resource is a configured grant (CG). Specifically, the first time-frequency resource is one or more time domain resources in a first CG, and the first CG is a set of CGs configured by the network device for the terminal device by using the first indication information.

Specifically, the network device configures a transmission parameter of the first CG for the terminal device by using the first indication information, and the transmission parameter includes one or more of the following parameters: a periodicity, a parameter related to open-loop power control, a waveform, a redundancy version, a redundancy version sequence, a quantity of repetitions, a frequency hopping mode, a resource allocation type, a hybrid automatic repeat request (HARQ) process number, a parameter related to a demodulation reference signal (DMRS), a modulation and coding scheme (MCS) table, a resource block group (RBG) size, a time domain resource position, a frequency domain resource position, and an MCS. When the terminal device performs uplink transmission with the network device, the terminal device may directly send uplink data to the network device by using the first CG preconfigured by the network device or the first CG preconfigured by the network device and activated by using physical layer signaling, and the terminal device does not need to send an SR to the network device and wait for a dynamic grant of the network device.

S102: The terminal device obtains first time information when the first time-frequency resource is unavailable.

Specifically, that the first time-frequency resource is unavailable may be understood as that the terminal device cannot perform data transmission on the first time-frequency resource. In the embodiment shown in FIG. 2, that the first time-frequency resource is unavailable includes but is not limited to any one or more of the following cases:

Case 1: A transmission resource of a high-priority service overlaps the first time-frequency resource in time domain. In other words, the first time-frequency resource is preempted by transmission of the high-priority service.

Case 2: In a time division duplex (TDD) system, the first time-frequency resource overlaps a downlink slot or a downlink symbol in time domain.

Case 3: In a system in which a measurement gap (MG) is configured (to be specific, the terminal device cannot perform data transmission in the measurement gap), the first time-frequency resource overlaps the measurement gap in time domain.

Case 4: On an unlicensed spectrum, listen before talk (LBT) performed by the terminal device on the first time-frequency resource fails. Specifically, on the unlicensed spectrum, to perform data transmission, the terminal device needs to perform channel detection before sending data. If it is detected that a status of a channel is busy, in other words, the channel is occupied, it indicates that the LBT fails, in other words, data transmission cannot be performed on the unlicensed spectrum currently.

In the foregoing four cases, unavailability of the first time-frequency resource in the case 1 and the case 4 is uncertain and bursty; unavailability of the first time-frequency resource in the case 2 and the case 3 is certain and known by the network device and the terminal device before the first time-frequency resource arrives.

The terminal device obtains the first time information when the first time-frequency resource is unavailable. The first time information is a time domain offset of a second time-frequency resource relative to the first time-frequency resource, or the first time information is an index of a time unit in which the second time-frequency resource is located. A time domain position of the second time-frequency resource is after a time domain position of the first time-frequency resource. In this embodiment of this application, the time unit may be a slot, a frame, a subframe, or a symbol.

Specifically, methods for obtaining the first time information by the terminal device include the following three obtaining methods.

Obtaining method 1: The terminal device determines the first time information according to a postponement rule, where the postponement rule is predefined.

Specifically, when the first time-frequency resource is unavailable, the terminal device postpones, to the second time-frequency resource, transmission of data originally carried on the first time-frequency resource. The postponement rule is as follows: The time unit in which the second time-frequency resource is located is a time unit that is at a foremost time domain position in one or more time units that meet a first condition. The time unit that meets the first condition is located after a time unit in which the first time-frequency resource is located, and has uplink data may be sent, and has no to-be-sent data needs to be sent.

For example, the network device configures a set of CGs for the terminal device, and the set of CGs is denoted as CG1. The first time-frequency resource is a resource of CG1 in a slot 2, and the first time-frequency resource is unavailable because the first time-frequency resource is preempted by a high-priority service. It is assumed that a slot that meets the first condition and whose time domain position is the foremost is a slot 4, in other words, the terminal device determines, according to the postponement rule, that a slot in which the second time-frequency resource is located is the slot 4. In this case, the first time information is that the time domain offset of the second time-frequency resource relative to the first time-frequency resource is 2 slots, or the first time information is that the index of the time unit in which the second time-frequency resource is located is 4.

Optionally, the time unit that meets the first condition may further need to meet the following conditions:

A time domain interval between the time unit that meets the first condition and the time unit of the first time-frequency resource is not greater than a threshold, where the threshold is configured by the network device for the terminal device; when the second time-frequency resource is a CG, a HARQ process number corresponding to a CG in the time unit that meets the first condition is the same as a HARQ process number corresponding to the first time-frequency resource.

Optionally, when a CG in which the first time-frequency resource is located changes, the foregoing postponement rule is no longer valid. Specifically, when the network device reconfigures a time domain position and/or a frequency domain position of the CG by using an RRC message or DCI, the foregoing postponement rule is no longer valid. For example, the network device configures one or more sets of CGs for the terminal device, and the first time-frequency resource is a part of time-frequency resources in the one or more sets of CGs. When the network device reconfigures time domain positions and/or frequency domain positions of the one or more sets of CGs by using an RRC message or DCI, the foregoing postponement rule is no longer valid.

Optionally, when a CG in which the first time-frequency resource is located is no longer valid, the foregoing postponement rule is no longer valid. Specifically, when the CG in which the first time-frequency resource is located is deactivated, or when a bandwidth part (BWP) or a serving cell in which the first time-frequency resource is located is deactivated, the foregoing postponement rule is no longer valid.

Obtaining method 2: The terminal device receives second indication information from the network device, and the terminal device determines the first time information based on the second indication information and according to a postponement rule, where the postponement rule is predefined. Specifically, an operation 1 and an operation 2 are included.

Operation 1: The network device sends the second indication information to the terminal device, where the second indication information indicates, to the terminal device, whether to use the postponement rule. Correspondingly, the terminal device receives the second indication information from the network device.

Specifically, the second indication information may be an RRC message, for example, an RRC setup message, an RRC resume message, or an RRC connection reconfiguration message. The second indication information and the first indication information may be a same message, or may be different messages. Manners in which the second indication information indicates, to the terminal device, whether to use the foregoing postponement rule may include the following four manners.

Manner 1: The second indication information includes a first information element, and the first information element indicates, to the terminal device by using one bit, whether to use the postponement rule. When a value of the bit is "1", the second indication information indicates the terminal device to use the postponement rule; when a value of the first information element is "0", the second indication information indicates the terminal device not to use the postponement rule. Alternatively, when a value of the first information element is "0", the second indication information indicates the terminal device to use the postponement rule; when a value of the first information element is "1", the second indication information indicates the terminal device not to use the postponement rule.

Manner 2: The second indication information includes a second information element, and the second information element indicates, by using n1 bits, whether to use the postponement rule for MAC entities of the terminal device. n1 indicates a quantity of MAC entities of the terminal device, each of the n1 bits corresponds to each MAC entity of the terminal device, and the network device configures different CGs for different MAC entities. When a value of any one of the n1 bits is "1", the second indication information indicates the terminal device to use the postponement rule for a CG configured for a MAC entity corresponding to the bit; when a value of any one of the n1 bits is "0", the second indication information indicates the terminal device not to use the postponement rule for a CG configured for a MAC entity corresponding to the bit. Alternatively, when a value of any one of the n1 bits is "0", the second indication information indicates the terminal device to use the postponement rule for a CG configured for a MAC entity corresponding to the bit; when a value of the any one of the n1 bits is "1", the second indication information indicates the terminal device not to use the postponement rule for a CG configured for a MAC entity corresponding to the bit.

Manner 3: The second indication information includes a third information element, and the third information element indicates, by using n2 bits, whether to use the postponement rule for sets of CGs. n2 indicates that the network device configures n2 sets of CGs for the terminal device, and each of the n2 bits corresponds to each set of CGs of the terminal device. When a value of any one of the n2 bits is "1", the second indication information indicates the terminal device to use the postponement rule for a CG corresponding to the bit; when a value of the any one of the n2 bits is "0", the second indication information indicates the terminal device not to use the postponement rule for a CG corresponding to the bit. Alternatively, when a value of any one of the n2 bits is "0", the second indication information indicates the terminal device to use the postponement rule for a CG corresponding to the bit; when a value of the any one of the n2 bits is "1", the second indication information indicates the terminal device not to use the postponement rule for a CG corresponding to the bit.

Manner 4: The second indication information includes a fourth information element, and the fourth information element indicates, by using n3 bits, whether to use the postponement rule for data on logical channels. n3 indicates that the terminal device is associated with n3 logical channels, and each of the n3 bits corresponds to each logical channel. When a value of any one of the n3 bits is "1", the second indication information indicates the terminal device to use the postponement rule for data on a logical channel corresponding to the bit when a CG is used for transmission; when a value of the any one of the n3 bits is "0", the second indication information indicates the terminal device not to use the postponement rule for data on a logical channel corresponding to the bit when a CG is used for transmission. Alternatively, when a value of any one of the n3 bits is "0", the second indication information indicates the terminal device to use the postponement rule for data on a logical channel corresponding to the bit when a CG is used for transmission; when a value of the any one of the n3 bits is "1", the second indication information indicates the terminal device not to use the postponement rule for data on a logical channel corresponding to the bit when a CG is used for transmission.

Operation 2: The terminal device determines the first time information based on the second indication information and according to the postponement rule, where the postponement rule is predefined.

Specifically, when the second indication information indicates to use the postponement rule, the terminal device determines the first time information according to the postponement rule. For a method for determining the first time information according to the postponement rule, refer to the descriptions in the obtaining method 1.

Obtaining method 3: The terminal device receives third indication information from the network device, where the third indication information indicates the first time information.

Specifically, the third indication information may be an RRC message, a medium access control (MAC) message, or DCI. A time domain position of a time-frequency resource carrying the third indication information is not later than the position of the first time-frequency resource.

In an optional manner, the third indication information indicates an index of a time unit in which the first time-frequency resource is located and an index of the time unit in which the second time-frequency resource is located. The terminal device determines, based on the foregoing indexes, the time unit in which the second time-frequency resource is located. Transmission of data originally carried on the first time-frequency resource is postponed to the second time-frequency resource.

In another optional manner, the third indication information indicates an index of a time unit in which the first time-frequency resource is located and the time domain offset of the second time-frequency resource relative to the first time-frequency resource. The terminal device determines, based on the foregoing index and time domain offset, the time unit in which the second time-frequency resource is located. Transmission of data originally carried on the first time-frequency resource is postponed to the second time-frequency resource. For example, the third indication information indicates that a slot in which the first time-frequency resource is located is a slot 1, and the time domain offset of the second time-frequency resource relative to the first time-frequency resource is 2 slots. In other words, transmission of data originally carried in the slot 1 is postponed to a slot 3.

In the foregoing two manners, the network device may implicitly indicate the index of the time unit in which the first time-frequency resource is located. For example, in a TDD system, when the first time-frequency resource is unavailable because the time unit in which the first time-frequency resource is located is a downlink time unit, the network device sends the third indication information in the time unit, where the third indication information implicitly indicates the time unit in which the first time-frequency resource is located. In other words, the time unit in which the first time-frequency resource is located is a time unit in which the terminal device receives the third indication information.

Optionally, when the network device configures a plurality of sets of CGs for the terminal device, the third indication information further indicates an index of a CG in which the first time-frequency resource is located. For example, the network device configures CG1 and CG2 for the terminal device, and the CG in which the first time-frequency resource is located is CG1. The network device indicates, by using the third indication information, an index of CG1, the index of the time unit in which the first time-frequency resource is located, and the first time information.

S103: The terminal device determines the second time-frequency resource based on the first time information and the first time-frequency resource, where the time domain position of the second time-frequency resource is after the time domain position of the first time-frequency resource.

When the first time information is the index of the time unit in which the second time-frequency resource is located, the terminal device determines the second time-frequency resource based on the index and the first time-frequency resource. Specifically, the terminal device determines, based on the index, the time unit in which the second time-frequency resource is located. After determining the time unit in which the second time-frequency resource is located, the terminal device shifts the first time-frequency resource to the time unit in which the second time-frequency resource is located. "Shift" means that a start symbol, a time domain length, a start resource block (RB), and a frequency domain width of the second time-frequency resource are consistent with those of the first time-frequency resource.

When the first time information is the time domain offset of the second time-frequency resource relative to the first time-frequency resource, the terminal device determines the second time-frequency resource based on the time domain offset and the first time-frequency resource. Specifically, the terminal device determines, based on the time domain offset and the time unit in which the first time-frequency resource is located, the time unit in which the second time-frequency resource is located. For example, if the time unit in which the first time-frequency resource is located is a slot 1, and the time domain offset is 2 slots, the time unit in which the second time-frequency resource is located is a slot 3. After determining the time unit in which the second time-frequency resource is located, the terminal device shifts the first time-frequency resource to the time unit in which the second time-frequency resource is located, that is, the second time-frequency resource.

S104: The terminal device sends the uplink data to the network device on the second time-frequency resource. Correspondingly, the network device receives the uplink data from the terminal device on the second time-frequency resource.

Through implementation of the foregoing method, when the first time-frequency resource used by the terminal device for uplink data transmission is unavailable, the terminal device postpones, based on the indication information of the network device and/or according to the postponement rule, the data transmission from the first time-frequency resource to a time-frequency resource closest to the first time-frequency resource. Therefore, a data transmission latency is reduced.

Figure 3:
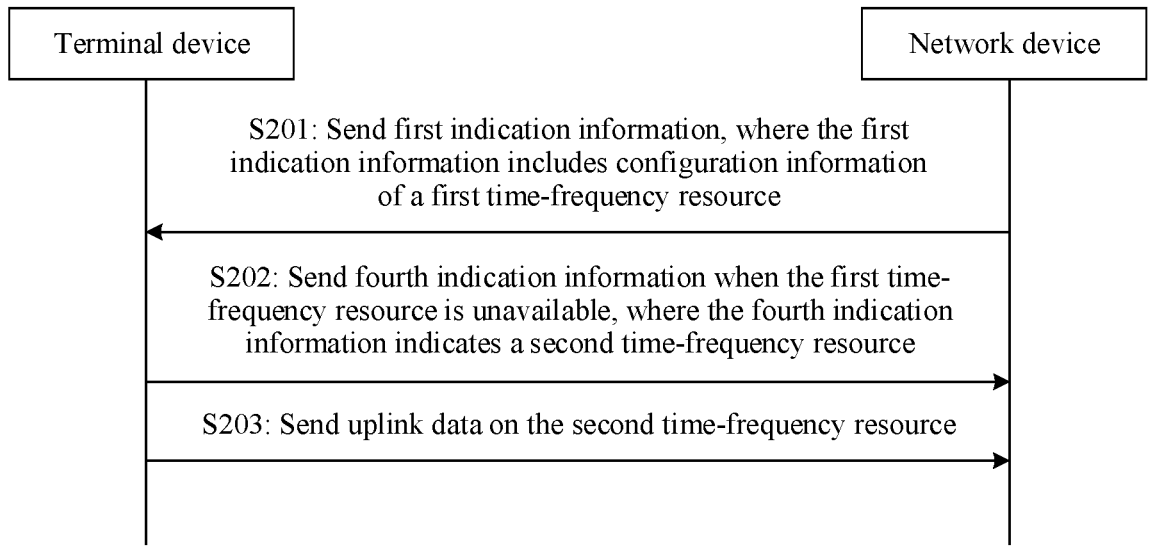

FIG. 3 is a schematic flowchart of a data transmission method according to an embodiment of this application. This embodiment relates to a specific process of uplink data transmission between a network device and a terminal device. As shown in FIG. 3, the method may include S201, S202, and S203.

S201: The network device sends first indication information to the terminal device, where the first indication information includes configuration information of a first time-frequency resource. Correspondingly, the terminal device receives the first indication information from the network device. For specific descriptions, refer to step S101 in FIG. 2.

S202: The terminal device sends fourth indication information to the network device when the first time-frequency resource is unavailable, where the fourth indication information indicates a second time-frequency resource, and a time domain position of the second time-frequency resource is after a time domain position of the first time-frequency resource. For a case in which the first time-frequency resource is unavailable, refer to the descriptions in step S102.

Specifically, the fourth indication information may be an RRC message, a MAC message, or uplink control information (UCI). The terminal device sends the fourth indication information to the network device on a time-frequency resource located before the position of the first time-frequency resource.

In an optional manner, the fourth indication information indicates an index of a time unit in which the first time-frequency resource is located and an index of a time unit in which the second time-frequency resource is located. The network device determines, based on the foregoing index, the time unit in which the second time-frequency resource is located, and transmission of data originally carried on the first time-frequency resource is postponed to the second time-frequency resource.

In another optional manner, the fourth indication information indicates an index of a time unit in which the first time-frequency resource is located and a time domain offset of the second time-frequency resource relative to the first time-frequency resource. The network device determines, based on the index and the time domain offset, the time unit in which the second time-frequency resource is located, and transmission of data originally carried on the first time-frequency resource is postponed to the second time-frequency resource. For example, the fourth indication information indicates that a slot in which the first time-frequency resource is located is a slot 1, and the time domain offset of the second time-frequency resource relative to the first time-frequency resource is 2 slots. The network device determines, based on the index and the time domain offset, that a slot in which the second time-frequency resource is located is a slot 3, in other words, transmission of data originally carried in the slot 1 is postponed to the slot 3.

Optionally, when the network device configures a plurality of sets of CGs for the terminal device, the fourth indication information further indicates an index of a CG in which the first time-frequency resource is located. For example, the network device configures CG1 and CG2 for the terminal device, and the CG in which the first time-frequency resource is located is CG1. The network device indicates, by using the fourth indication information, an index of CG1, the index of the time unit in which the first time-frequency resource is located, and either of the index of the time unit in which the second time-frequency resource is located and the time domain offset of the second time-frequency resource relative to the first time-frequency resource.

S203: The terminal device sends the uplink data to the network device on the second time-frequency resource. Correspondingly, the network device receives the uplink data from the terminal device on the second time-frequency resource.

Through implementation of the foregoing method, when the first time-frequency resource is unavailable due to an LBT failure of the terminal device, because the network device cannot predict that the first time-frequency resource is unavailable, the terminal device postpones the data transmission from the first time-frequency resource to a time-frequency resource closest to the first time-frequency resource, and indicates postponement information to the network device, so that the network device can receive the data of the terminal device on the corresponding time-frequency resource. Therefore, data transmission reliability is improved.

Figure 4:
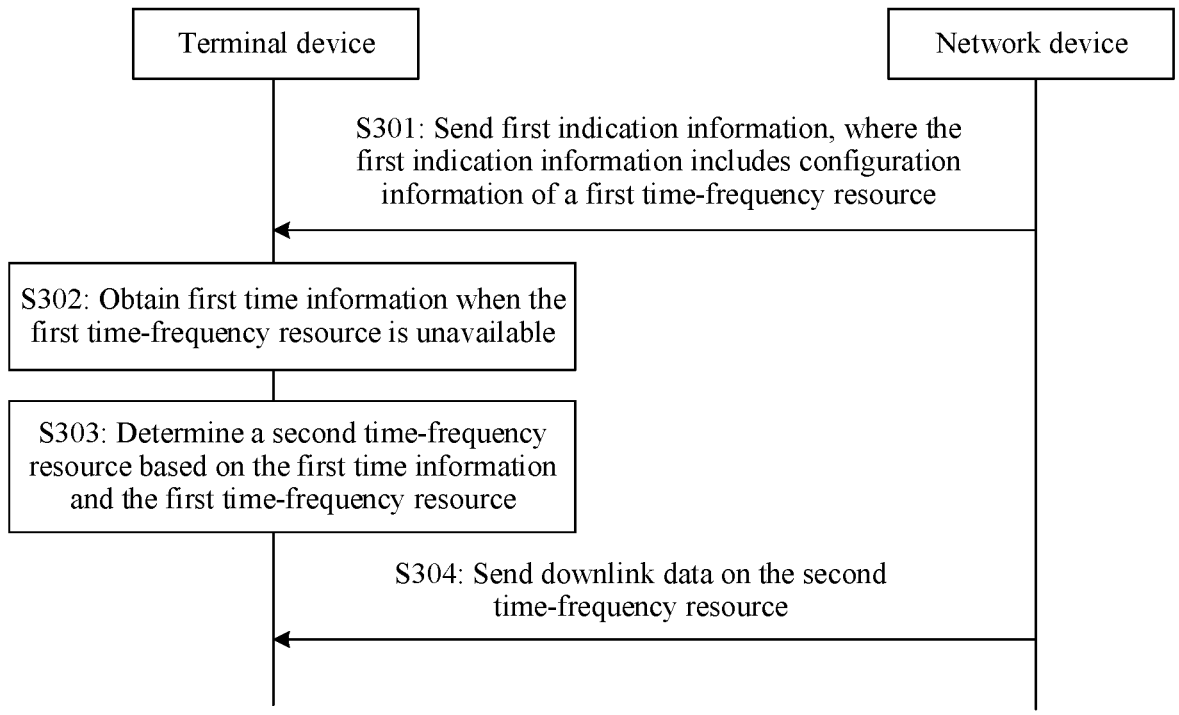

FIG. 4 is a schematic flowchart of a data transmission method according to an embodiment of this application. This embodiment relates to a specific process of downlink data transmission between a network device and a terminal device. As shown in FIG. 4, the method may include S301, S302, S303, and S304.

S301: The network device sends first indication information to the terminal device, where the first indication information includes configuration information of a first time-frequency resource. Correspondingly, the terminal device receives the first indication information from the network device. The first indication information may be an RRC message, a MAC message, or physical layer signaling.

In the embodiment shown in FIG. 3, the first time-frequency resource is a downlink SPS resource. Specifically, the first time-frequency resource is one or more time domain resources in a first SPS, and the first SPS is a set of SPS resources configured by the network device for the terminal device by using the first indication information.

Specifically, the network device configures transmission parameters of the first SPS for the terminal device by using the first indication information, and the parameters include a periodicity, a HARQ process number, a time domain resource position, a frequency domain resource position, an MCS, or the like. When the first SPS is activated by the network device by using physical layer signaling, the terminal device receives downlink data from the network device on the first SPS resource.

S302: The terminal device obtains first time information when the first time-frequency resource is unavailable.

In step S302, that the first time-frequency resource is unavailable includes but is not limited to one of the following cases.

Case 1: A transmission resource of a high-priority service overlaps the first time-frequency resource in time domain. In other words, the first time-frequency resource is preempted by transmission of the high-priority service.

Case 2: In a TDD system, the first time-frequency resource overlaps an uplink slot or an uplink symbol in time domain.

Case 3: In a system in which a measurement gap is configured, the first time-frequency resource overlaps the measurement gap in time domain.

Case 4: On an unlicensed spectrum, LBT performed by the network device on the first time-frequency resource fails. Specifically, on the unlicensed spectrum, to preempt a channel, the network device needs to perform channel detection before sending data. If it is detected that a status of the channel is busy, in other words, the channel is occupied, it indicates that the LBT fails.

Case 5: The terminal device does not receive the downlink data from the network device on the first time-frequency resource. Specifically, the terminal device does not receive a pilot signal on the first time-frequency resource.

In the foregoing five cases, unavailability of the first time-frequency resource in the case 1, the case 4, and the case 5 is uncertain and bursty; unavailability of the first time-frequency resource in the case 2 and the case 3 is certain and known by the network device and the terminal device before the first time-frequency resource arrives.

The terminal device obtains the first time information when the first time-frequency resource is unavailable. The first time information is a time domain offset of a second time-frequency resource relative to the first time-frequency resource, or the first time information is an index of a time unit in which the second time-frequency resource is located. A time domain position of the second time-frequency resource is after a time domain position of the first time-frequency resource.

Specifically, methods for obtaining the first time information by the terminal device include the following three obtaining methods.

Obtaining method 1: The terminal device determines the first time information according to a postponement rule, where the postponement rule is predefined.

Specifically, when the first time-frequency resource is unavailable, the network device postpones, to the second time-frequency resource, transmission of the data originally carried on the first time-frequency resource. The postponement rule is as follows: The time unit in which the second time-frequency resource is located is a time unit that is at a foremost time domain position in one or more time units that meet a second condition. The time unit that meets the second condition is located after a time unit in which the first time-frequency resource is located, and has downlink data may be sent, and has no to-be-sent data needs to be sent.

For example, the network device configures a set of SPSs for the terminal device, and the set of SPSs is denoted as SPS1. The first time-frequency resource is a resource of SPS1 in a slot 2, and the first time-frequency resource is unavailable because the first time-frequency resource is preempted by a high-priority service. A slot that meets the second condition and whose time domain position is the foremost is a slot 4, in other words, the terminal device determines, according to the postponement rule, that a slot in which the second time-frequency resource is located is the slot 4. In this case, the first time information is that the time domain offset of the second time-frequency resource relative to the first time-frequency resource is 2 slots, or the first time information is that the index of the time unit in which the second time-frequency resource is located is 4.

Optionally, the time unit that meets the second condition may further need to meet the following conditions: A time domain interval between the time unit that meets the second condition and the time unit of the first time-frequency resource is not greater than a threshold, where the threshold is configured by the network device for the terminal device; when the second time-frequency resource is an SPS, a HARQ process number corresponding to an SPS in the time unit that meets the second condition is the same as a HARQ process number corresponding to the first time-frequency resource.

Optionally, when an SPS in which the first time-frequency resource is located changes, the foregoing postponement rule is no longer valid. Specifically, when the network device reconfigures a time domain position and/or a frequency domain position of the SPS by using an RRC message or DCI, the foregoing postponement rule is no longer valid. For example, the network device configures one or more sets of SPSs for the terminal device, and the first time-frequency resource is a part of time-frequency resources in the one or more sets of SPSs. When the network device reconfigures time domain positions and/or frequency domain positions of the one or more sets of SPSs by using an RRC message or DCI, the foregoing postponement rule is no longer valid.

Optionally, when an SPS in which the first time-frequency resource is located is no longer valid, the foregoing postponement rule is no longer valid. Specifically, when the SPS in which the first time-frequency resource is located is deactivated, or when a BWP or a serving cell in which the first time-frequency resource is located is deactivated, the foregoing postponement rule is no longer valid.

Obtaining method 2: The terminal device receives second indication information from the network device, and the terminal device determines the first time information based on the second indication information and according to a postponement rule, where the postponement rule is predefined.

For specific descriptions of the obtaining manner 2, refer to the descriptions of the obtaining manner 2 in step S102. To be specific, when referring to the descriptions of the obtaining manner 2 in step S102, the CG in the obtaining manner 2 can be replaced with an SPS.

Obtaining method 3: The terminal device receives third indication information from the network device, where the third indication information indicates the first time information.

Specifically, the third indication information may be an RRC message, a MAC message, or DCI. A time domain position of a time-frequency resource carrying the third indication information is not later than the position of the first time-frequency resource.

In an optional manner, the third indication information indicates an index of a time unit in which the first time-frequency resource is located and an index of the time unit in which the second time-frequency resource is located. The terminal device determines, based on the foregoing indexes, the time unit in which the second time-frequency resource is located. Transmission of the data originally carried on the first time-frequency resource is postponed to the second time-frequency resource.

In another optional manner, the third indication information indicates an index of a time unit in which the first time-frequency resource is located and the time domain offset of the second time-frequency resource relative to the first time-frequency resource. The terminal device determines, based on the foregoing index and time domain offset, the time unit in which the second time-frequency resource is located. Transmission of the data originally carried on the first time-frequency resource is postponed to the second time-frequency resource. For example, the third indication information indicates that a slot in which the first time-frequency resource is located is a slot 1, and the time domain offset of the second time-frequency resource relative to the first time-frequency resource is 2 slots. In other words, transmission of data originally carried in the slot 1 is postponed to a slot 3.

S303: The terminal device determines the second time-frequency resource based on the first time information and the first time-frequency resource, where the time domain position of the second time-frequency resource is after the time domain position of the first time-frequency resource. For specific descriptions, refer to step S103 in FIG. 1.

S304: The network device sends the downlink data to the terminal device on the second time-frequency resource. Correspondingly, the terminal device receives the downlink data from the network device on the second time-frequency resource.

Through implementation of the foregoing method, when the first time-frequency resource used to transmit the downlink data is unavailable, the network device postpones the downlink transmission on the first time-frequency resource to the second time-frequency resource, and notifies the terminal device of postponement information by using the indication information, so that the terminal device can receive the data of the network device on the corresponding time-frequency resource. Therefore, data transmission reliability is improved.

Figure 5:
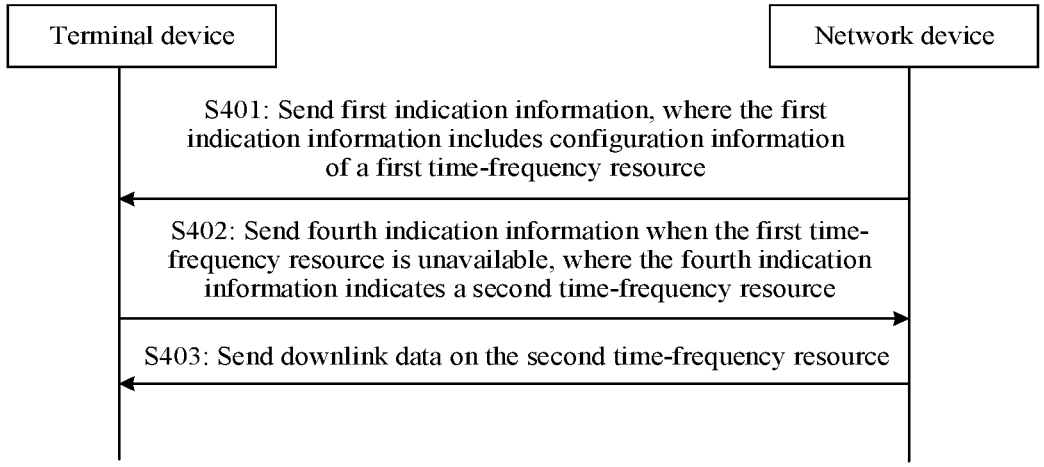

FIG. 5 is a schematic flowchart of a data transmission method according to an embodiment of this application. This embodiment relates to a specific process of downlink data transmission between a network device and a terminal device. As shown in FIG. 5, the method may include S401, S402, and S403.

S401: The network device sends first indication information to the terminal device, where the first indication information includes configuration information of a first time-frequency resource. Correspondingly, the terminal device receives the first indication information from the network device. For specific descriptions, refer to step S301 in FIG. 4.

S402: The terminal device sends fourth indication information to the network device when the first time-frequency resource is unavailable, where the fourth indication information indicates a second time-frequency resource. A time domain position of the second time-frequency resource is after a time domain position of the first time-frequency resource. For a case in which the first time-frequency resource is unavailable, refer to the descriptions in step S302.

Specifically, the fourth indication information may be an RRC message, a MAC message, or UCI. A time-frequency resource carrying the fourth indication information is not later than the first time-frequency resource.

In an optional manner, the fourth indication information indicates an index of a time unit in which the first time-frequency resource is located and an index of a time unit in which the second time-frequency resource is located. The network device determines, based on the foregoing indexes, the time unit in which the second time-frequency resource is located, and transmission of data originally carried on the first time-frequency resource is postponed to the second time-frequency resource.

In another optional manner, the fourth indication information indicates an index of a time unit in which the first time-frequency resource is located and a time domain offset of the second time-frequency resource relative to the first time-frequency resource. The network device determines, based on the index and the time domain offset, the time unit in which the second time-frequency resource is located, and transmission of data originally carried on the first time-frequency resource is postponed to the second time-frequency resource.

In the foregoing two manners, the terminal device may implicitly indicate the index of the time unit in which the first time-frequency resource is located. For example, in a TDD system, when the first time-frequency resource is unavailable because the time unit in which the first time-frequency resource is located is an uplink time unit, the terminal device sends the fourth indication information in the time unit, where the fourth indication information implicitly indicates the time unit in which the first time-frequency resource is located. In other words, the time unit in which the first time-frequency resource is located is a time unit in which the network device receives the fourth indication information.

S403: The network device sends the downlink data to the terminal device on the second time-frequency resource. Correspondingly, the terminal device receives the downlink data from the network device on the second time-frequency resource.

Through implementation of the foregoing method, when the first time-frequency resource used by the terminal device to transmit the uplink data is preempted by uplink data with a higher priority, the terminal device may postpone transmission of the uplink data from the first time-frequency resource to a time-frequency resource closest to the first time-frequency resource, and indicate postponement information to the network device, so that the network device can receive the uplink data on the corresponding time-frequency resource. Therefore, data transmission reliability is improved.

The terminal device postpones, based on the indication information of the network device and/or according to the postponement rule, the data transmission from the first time-frequency resource to the time-frequency resource closest to the first time-frequency resource. Therefore, a data transmission latency is reduced.

It may be understood that, to implement the functions in the foregoing embodiments, the network device and the terminal device include corresponding hardware structures and/or software modules for performing the functions. A person skilled in the art should easily be aware that, in combination with the units and the method steps in the examples described in embodiments disclosed in this application, this application can be implemented by hardware, software, or a combination of hardware and software. Whether a function is performed by hardware, software, or hardware driven by computer software depends on particular application scenarios and design constraints of the technical solutions.

Figure 6:
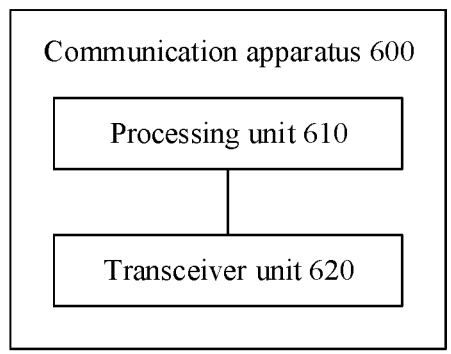
FIG. 6 and FIG. 7 are schematic diagrams of structures of possible communication apparatuses according to embodiments of this application.
Figure 7:
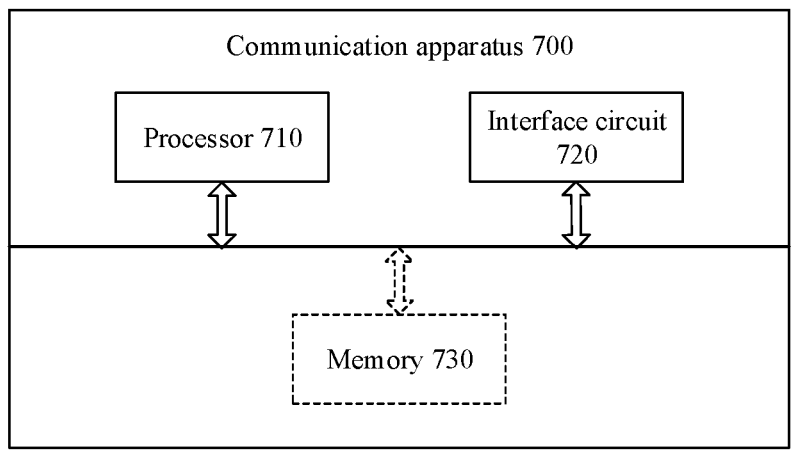

FIG. 6 and FIG. 7 are schematic diagrams of structures of possible communication apparatuses according to embodiments of this application. The communication apparatus may be configured to implement the functions of the terminal device or the network device in the foregoing method embodiments. Therefore, beneficial effects of the foregoing method embodiments can also be implemented. In embodiments of this application, the communication apparatus may be the terminal device 130 or the terminal device 140 shown in FIG. 1, may be the radio access network device 120 shown in FIG. 1, or may be a module (for example, a chip) used in the terminal device or the network device.

As shown in FIG. 6, a communication apparatus 600 includes a processing unit 610 and a transceiver unit 620. The communication apparatus 600 is configured to implement the functions of the terminal device or the network device in the method embodiments shown in FIG. 2 to FIG. 5.

In a case in which the communication apparatus 600 is configured to implement the functions of the terminal device in the method embodiment shown in FIG. 2: The transceiver unit 620 is configured to receive first indication information from a network device, where the first indication information includes configuration information of a first time-frequency resource. The processing unit 610 is configured to obtain first time information when the first time-frequency resource is unavailable. The processing unit 610 is further configured to determine a second time-frequency resource based on the first time information and the first time-frequency resource, where a time domain position of the second time-frequency resource is after a time domain position of the first time-frequency resource. The transceiver unit 620 is further configured to send uplink data to the network device on the second time-frequency resource.

In a case in which the communication apparatus 600 is configured to implement the functions of the network device in the method embodiment shown in FIG. 2: The transceiver unit 620 is configured to send first indication information to a terminal device, where the first indication information includes configuration information of a first time-frequency resource. The processing unit 610 is configured to: when the first time-frequency resource is unavailable, determine a second time-frequency resource based on first time information and the first time-frequency resource, where a time domain position of the second time-frequency resource is after a time domain position of the first time-frequency resource. The transceiver unit 620 is further configured to receive uplink data from the terminal device on the second time-frequency resource.

In a case in which the communication apparatus 600 is configured to implement the functions of the terminal device in the method embodiment shown in FIG. 3: The transceiver unit 620 is configured to receive first indication information from a network device, where the first indication information includes configuration information of a first time-frequency resource. The transceiver unit 620 is further configured to send fourth indication information to the network device when the first time-frequency resource is unavailable, where the fourth indication information indicates a second time-frequency resource, and a time domain position of the second time-frequency resource is after a time domain position of the first time-frequency resource. The transceiver unit 620 is further configured to send uplink data to the network device on the second time-frequency resource.

In a case in which the communication apparatus 600 is configured to implement the functions of the network device in the method embodiment shown in FIG. 3: The transceiver unit 620 is configured to send first indication information to a terminal device, where the first indication information includes configuration information of a first time-frequency resource. The transceiver unit 620 is further configured to receive fourth indication information from the terminal device when the first time-frequency resource is unavailable, where the fourth indication information indicates a second time-frequency resource, and a time domain position of the second time-frequency resource is after a time domain position of the first time-frequency resource. The transceiver unit 620 is further configured to receive uplink data from the terminal device on the second time-frequency resource.

In a case in which the communication apparatus 600 is configured to implement the functions of the terminal device in the method embodiment shown in FIG. 4: The transceiver unit 620 is configured to receive first indication information from a network device, where the first indication information includes configuration information of a first time-frequency resource. The processing unit 610 is configured to obtain first time information when the first time-frequency resource is unavailable. The processing unit 610 is further configured to determine a second time-frequency resource based on the first time information and the first time-frequency resource, where a time domain position of the second time-frequency resource is after a time domain position of the first time-frequency resource. The transceiver unit 620 is further configured to receive downlink data from the network device on the second time-frequency resource.

In a case in which the communication apparatus 600 is configured to implement the functions of the network device in the method embodiment shown in FIG. 4: The transceiver unit 620 is configured to send first indication information to a terminal device, where the first indication information includes configuration information of a first time-frequency resource. The processing unit 610 is configured to: when the first time-frequency resource is unavailable, determine a second time-frequency resource based on first time information and the first time-frequency resource, where a time domain position of the second time-frequency resource is after a time domain position of the first time-frequency resource. The transceiver unit 620 is further configured to send downlink data to the terminal device on the second time-frequency resource.

In a case in which the communication apparatus 600 is configured to implement the functions of the terminal device in the method embodiment shown in FIG. 5: The transceiver unit 620 is configured to receive first indication information from a network device, where the first indication information includes configuration information of a first time-frequency resource. The transceiver unit 620 is further configured to send fourth indication information to the network device when the first time-frequency resource is unavailable, where the fourth indication information indicates a second time-frequency resource, and a time domain position of the second time-frequency resource is after a time domain position of the first time-frequency resource. The transceiver unit 620 is further configured to receive downlink data from the network device on the second time-frequency resource.

In a case in which the communication apparatus 600 is configured to implement the functions of the network device in the method embodiment shown in FIG. 5: The transceiver unit 620 is configured to send first indication information to a terminal device, where the first indication information includes configuration information of a first time-frequency resource. The transceiver unit 620 is further configured to receive fourth indication information from the terminal device when the first time-frequency resource is unavailable, where the fourth indication information indicates a second time-frequency resource, and a time domain position of the second time-frequency resource is after a time domain position of the first time-frequency resource. The transceiver unit 620 is further configured to send downlink data to the terminal device on the second time-frequency resource.

For more detailed descriptions of the processing unit 610 and the transceiver unit 620, directly refer to related descriptions in the method embodiments shown in FIG. 2 to FIG. 5. Details are not described herein.

As shown in FIG. 7, a communication apparatus 700 includes a processor 710 and an interface circuit 720. The processor 710 and the interface circuit 720 are coupled to each other. It may be understood that the interface circuit 720 may be a transceiver or an input/output interface. Optionally, the communication apparatus 700 may further include a memory 730, configured to store instructions executed by the processor 710, input data required by the processor 710 to run the instructions, or data generated after the processor 710 runs the instructions.

When the communication apparatus 700 is configured to implement the methods shown in FIG. 2 to FIG. 5, the processor 710 is configured to implement the functions of the processing unit 610, and the interface circuit 720 is configured to implement the functions of the transceiver unit 620.

When the communication apparatus is a chip used in a terminal device, the chip in the terminal device implements the functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements the functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor.

In embodiments of this application, the processor may be a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or a storage medium in any other form well-known in the art. For example, a storage medium is coupled to the processor, so that the processor can read information from the storage medium or write information into the storage medium. Certainly, the storage medium may also be a component of the processor. The processor and the storage medium may be disposed in an ASIC. In addition, the ASIC may be located in a network device or a terminal device. Certainly, the processor and the storage medium may alternatively exist in the network device or the terminal device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, the procedure or functions according to embodiments of this application are completely or partially generated. The computer may be a general-purpose computer, a dedicated computer, a computer network, a network device, a terminal device, or another programmable apparatus. The computer programs or the instructions may be stored in a computer-readable storage medium, or may be transmitted through the computer-readable storage medium. The computer-readable storage medium may be any usable medium accessible by a computer, or a data storage device, such as a server, integrating one or more usable media. The usable medium may be a magnetic medium, for example, a floppy disk, a hard disk drive, or a magnetic tape; or may be an optical medium, for example, a DVD; or may be a semiconductor medium, for example, a solid state disk (SSD).

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The sequence numbers of the foregoing processes do not mean an execution sequence, and the execution sequence of the processes should be determined based on functions and internal logic of the processes.

What is claimed is:

1. A data transmission method applied to a data transmission apparatus, wherein the method comprises:
    receiving first indication information from a network device, wherein the first indication information comprises configuration information of a first time-frequency resource;
    receiving second indication information from the network device, wherein the second indication information indicates whether to use a postponement rule, wherein the postponement rule is predefined;
    based on determining that the first time-frequency resource overlaps a downlink slot or a downlink symbol in time domain, determining a second time-frequency resource based on the second indication information and according to the postponement rule, wherein a time domain position of the second time-frequency resource is after a time domain position of the first time-frequency resource; and
    sending uplink data to the network device on the second time-frequency resource, or receiving downlink data from the network device on the second time-frequency resource.

2. The method according to claim 1, wherein the first time-frequency resource is a configured grant (CG) or a downlink semi-persistent scheduling (SPS) resource.

3. The method according to claim 1, wherein the second indication information comprises one or more bits to indicate whether to use the postponement rule.

4. The method according to claim 3, wherein each bit among the one or more bits corresponds to a Media Access Control (MAC) entity among one or more MAC entities, and wherein the bit indicates whether a terminal device uses the postponement rule for the corresponding MAC entity among the one or more MAC entities.

5. The method according to claim 3, wherein each bit among the one or more bits corresponds to a configured grant (CG) among one or more CGs, and wherein a bit indicates whether the terminal device uses the postponement rule for the corresponding CG among the one or more CGs.

6. The method according to claim 3, wherein each bit among the one or more bits corresponds to a logic channel among one or more logic channels, and wherein the bit indicates whether a terminal device uses the postponement rule for the corresponding logic channel among the one or more logic channels.

7. The method according to claim 1, wherein a hybrid automatic repeat request (HARQ) process number corresponding to the second time-frequency resource is the same as a HARQ process number corresponding to the first time-frequency resource.

8. A data transmission method applied to a data transmission apparatus, wherein the method comprises:

sending first indication information to a terminal device, wherein the first indication information comprises configuration information of a first time-frequency resource;

sending second indication information to the terminal device, wherein the second indication information indicates whether to use a postponement rule by the terminal device, wherein the postponement rule is predefined;

based on determining the first time-frequency resource overlaps a downlink slot or a downlink symbol in time domain, determining a second time-frequency resource according to the first time-frequency resource and the postponement rule, wherein a time domain position of the second time-frequency resource is after a time domain position of the first time-frequency resource; and receiving uplink data from the terminal device on the second time-frequency resource, or sending downlink data to the terminal device on the second time-frequency resource.

9. The method according to claim 8, wherein the first time-frequency resource is a configured grant (CG) or a downlink semi-persistent scheduling (SPS).

10. The method according to claim 8, wherein a hybrid automatic repeat request (HARQ) process number corresponding to the second time-frequency resource is the same as a HARQ process number corresponding to the first time-frequency resource.

11. A data transmission apparatus comprising:
at least one processor; and
a memory coupled to the at least one processor and configured to store executable instructions for execution by the at least one processor to instruct the at least one processor to:
receive first indication information from a network device, wherein the first indication information comprises configuration information of a first time-frequency resource;
receive second indication information from the network device, wherein the second indication information indicates whether to use a postponement rule, wherein the postponement rule is predefined;
based on determining that the first time-frequency resource overlaps a downlink slot or a downlink symbol in time domain, determine a second time-frequency resource based on the second indication information and according to the postponement rule, wherein a time domain position of the second time-frequency resource is after a time domain position of the first time-frequency resource; and
send uplink data to the network device on the second time-frequency resource, or receive downlink data from the network device on the second time-frequency resource.

12. The apparatus according to claim 11, wherein the first time-frequency resource is a configured grant (CG) or a downlink semi-persistent scheduling (SPS) resource.

13. The apparatus according to claim 11, wherein a hybrid automatic repeat request (HARQ) process number corresponding to the second time-frequency resource is the same as a HARQ process number corresponding to the first time-frequency resource.

14. A data transmission apparatus comprising:
at least one processor; and
a memory coupled to the at least one processor and configured to store executable instructions for execution by the at least one processor to instruct the at least one processor to:
send first indication information to a terminal device, wherein the first indication information comprises configuration information of a first time-frequency resource;
send second indication information to the terminal device, wherein the second indication information indicates whether to use a postponement rule by the terminal device, wherein the postponement rule is predefined;
based on determining the first time-frequency resource overlaps a downlink slot or a downlink symbol in time domain, determine a second time-frequency resource according to the first time-frequency resource and the postponement rule, wherein a time domain position of the second time-frequency resource is after a time domain position of the first time-frequency resource; and
receive uplink data from the terminal device on the second time-frequency resource, or send downlink data to the terminal device on the second time-frequency resource.

15. The apparatus according to claim 14, wherein the first time-frequency resource is a configured grant (CG) or a downlink semi-persistent scheduling (SPS).

16. The apparatus according to claim 14, wherein a hybrid automatic repeat request (HARQ) process number corresponding to the second time-frequency resource is the same as a HARQ process number corresponding to the first time-frequency resource.

* * * * *